(12) United States Patent
Miller et al.

(10) Patent No.: US 6,512,522 B1
(45) Date of Patent: Jan. 28, 2003

(54) ANIMATION OF THREE-DIMENSIONAL CHARACTERS ALONG A PATH FOR MOTION VIDEO SEQUENCES

(75) Inventors: Paul Miller, Tewksbury, MA (US); Brian E. Paul, Lowell, MA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/293,497

(22) Filed: Apr. 15, 1999

(51) Int. Cl.$^7$ ................................................ G06T 15/70
(52) U.S. Cl. ..................................................... 345/474
(58) Field of Search ................................ 345/467, 468, 345/660, 661, 662, 471, 472, 473, 474

(56) References Cited

U.S. PATENT DOCUMENTS

| | | | |
|---|---|---|---|
| 4,305,131 A | 12/1981 | Best | |
| 4,600,919 A | 7/1986 | Stern | 340/725 |
| 4,821,214 A | 4/1989 | Sederberg | |
| 4,888,583 A | 12/1989 | Ligocki et al. | 340/729 |
| 4,930,092 A | 5/1990 | Reilly | 364/522 |
| 5,097,411 A | 3/1992 | Doyle et al. | 395/600 |
| 5,155,822 A | 10/1992 | Doyle et al. | 395/400 |

(List continued on next page.)

FOREIGN PATENT DOCUMENTS

| EP | 0 569 758 A | 11/1993 |
|---|---|---|
| EP | 0569758 | 11/1993 |

OTHER PUBLICATIONS

Elliot et al. Inside 3D Studio MAX2: vol 1. New Riders Pub. Indianapolis, IN. 1998. "Chapter 20 Animation Control Tools". pp. 287–340.*

(List continued on next page.)

Primary Examiner—Almis R. Jankus
(74) Attorney, Agent, or Firm—Peter J. Gordon

(57) ABSTRACT

A character is represented in a character generator as a set of polygons. The character may be manipulated using three-dimensional animation techniques. A code for a character may be used to access a set of curves defining the outline of the character. This set of curves is transformed into a set of polygons. The set of polygons may be rendered as a three-dimensional object. The set of polygons may be created by converting the curves into sets of connected line segments and then tessellating the polygon defined by the line segments. Animation properties are represented using a normalized scale along a path or over time. Animation may be provided in a manner that is independent of the spatial and temporal resolution of the video to which it is applied. Such animation may be applied to characters defined by a set of polygons. Various three-dimensional spatial transformations, lighting effects and other colorizations may be provided. A user interface for editing a character string may provide two alternate displays. A first display allows a user to input and view any desired portion of the character string for the purpose of editing. A second display allows a user to view how the character string appears at a selected point in time during a titling effect for the purpose of animation. In both displays, the text is displayed in a three-dimensional form. This interface may be combined with a timeline editing interface for editing an associated video program, or other user interface, to permit layering of titling effects and adjustment of animation properties, positioning and timing.

36 Claims, 13 Drawing Sheets

U.S. PATENT DOCUMENTS

| | | | |
|---|---|---|---|
| 5,307,451 A | 4/1994 | Clark | 395/127 |
| 5,307,456 A | 4/1994 | MacKay | 395/154 |
| 5,361,386 A | 11/1994 | Watkins et al. | |
| 5,421,589 A | 6/1995 | Monroe | 273/437 |
| 5,455,902 A | 10/1995 | Ellson et al. | 395/152 |
| 5,488,684 A | 1/1996 | Gharachorloo et al. | |
| 5,539,868 A | 7/1996 | Hosoya et al. | |
| 5,544,291 A | 8/1996 | Gilley et al. | 395/123 |
| 5,555,356 A | 9/1996 | Scheibl | 395/134 |
| 5,602,979 A | 2/1997 | Loop | 395/123 |
| 5,606,652 A | 2/1997 | Silverbrook | |
| 5,611,026 A | 3/1997 | Berend et al. | |
| 5,611,036 A | 3/1997 | Berend et al. | |
| 5,630,043 A | 5/1997 | Uhlin | 395/174 |
| 5,692,117 A | 11/1997 | Berend et al. | 395/152 |
| 5,717,848 A | 2/1998 | Watanabe et al. | |
| 5,736,991 A | 4/1998 | Tada | |
| 5,745,666 A | 4/1998 | Gilley et al. | 395/128 |
| 5,745,710 A | 4/1998 | Clanton, III et al. | 395/327 |
| 5,771,167 A | 6/1998 | Gomi et al. | 364/140 |
| 5,805,783 A | 9/1998 | Ellson et al. | 395/168 |
| 5,826,102 A | 10/1998 | Escobar et al. | 395/806 |
| 5,852,672 A | 12/1998 | Lu | 382/154 |
| 5,867,172 A | 2/1999 | Fujisawa et al. | 345/467 |
| 5,963,209 A | 10/1999 | Hoppe | |
| 6,404,435 B1 | 6/2002 | Miller et al. | |

OTHER PUBLICATIONS

Elliot et al. Inside 3D Studio MAX2: vol 1. New Riders Pub. Indianapolis, IN. 1998. "Chapter 8 Modeling with Shapes". pp. 287–340.*

Avid Marquee Tutorial Guide, Release 1.0, Jul. 19, 1998.

U.S. patent application Ser. No. 09/054,763, Miller et al., filed Apr. 3, 1998.

Reinhard, Klein, "Multiresolution Representations for Surfaces Meshes Based on the Vertex Decimation Method", Computer & Graphics, vol. 22, No. 1, 1998, pp. 13–26.

Doenges, Peter et al., MPEG–4 Audio/Video and synthetic graphics/audio for mixed media, Signal Processing Image Communications 9, 1997, pp. 433–463.

DP Series Manual, 3D Animation, from Dynatech Corp. 1991–1992.(Oct.).

Reinhard K: Multiresolution representation for surfaces meshes based on the vertex decimation method, Computers and Graphics, vol. 22, No. 1, Feb. 1998, pp. 13–26.

Doenges P K et al: Audio/video and synthetic graphics/audio for mixed media, Signal Processing Image Communication, vol. 9, No. 4, May 1997, pp. 433–463.

* cited by examiner

```
PROC VisitNode (Node n)
    Property p;
    FOR EACH p in n's list DO                               80
        Push p onto its corresponding property stack
    END DO
                                            82
    ProcessThisNode (layout or draw)
                             84
    FOR EACH child (c) o n DO
                          86
        VisitNode (c);
    END DO
                                    88
    FOR EACH p in n's property list DO                 90
        Pop p's corresponding property stack
    END DO
END PROC
```

*FIG. 5*

ANIMATION OF THREE-DIMENSIONAL CHARACTERS ALONG A PATH FOR MOTION VIDEO SEQUENCES

BACKGROUND

Character generators are systems that are used to add text, such as titles and credits, to video programs, such as a television, film, video and other multimedia programs. Titles often are designed to roll or crawl over a screen, commonly called scrolling. Other effects commonly are performed. Some character generators focus on providing real-time multichannel mixing of titling and video. Some provide more advanced creative features which are not producible in real-time.

Most computer systems which render alphanumeric character strings, such as word processors or character generators, generally represent the character string as a set of characters, for example by using a tree or an array. Each character is defined by a code that refers to a bit-mapped image or raster image of the character. Alternatively, the code may refer to a set of curves defining the outline of the character which is converted to a bit-map or raster image. The data structure representing the character string is processed to layout each character in a plane according to the font, the character metric, the character size and the spacing between characters. The characters are then drawn in the image by placing the image of the character at a designated position in the plane. The plane is then displayed, possibly with some spatial transformation. Because character generators generally use bit-mapped images or raster images of text to add characters to video, spatial transformations performed on the characters may result in visual artifacts that are undesirable, such as pixellation.

Several systems are available through which three-dimensional models of characters may be generated. One such system is shown in U.S. Pat. No. 5,805,783 (Ellson). Additional systems are described in "Designer Letters," *Computer Graphics,* November 1991. Most three-dimensional character generation systems require either complex three-dimensional model generation software, in which animation is provided through the same mechanisms that other three-dimensional models are animated. In such systems it is difficult to provide the real time editing and viewing of these three-dimensional effects.

SUMMARY

A character is represented in a character generator as a set of polygons and may be manipulated using three-dimensional animation techniques. A code for a character may be used to access a set of curves defining the outline of the character. This set of curves is transformed into a set of polygons. The set of polygons may be rendered as a three-dimensional object. The set of polygons may be created by converting the curves into sets of connected line segments and then tessellating the polygon defined by the line segments.

Properties of a character may be animated over time or along a path. Animation over time may use a normalized scale over time to allow animation to be provided in a manner that is independent of the spatial and temporal resolution of the video to which it is applied. Properties of a character also may be a function of position of the character on a path. The position of the character on the path may vary over time or may be static. Two paths or rails also may be used to define the spatial properties of characters. Such animation may be applied to characters defined by a set of polygons. Various three-dimensional spatial transformations, lighting effects and other colorizations may be provided. These effects may be defined by key frames in an editing system used to create video program.

A user interface for editing a character string may provide two alternate displays. A first display allows a user to input and view any desired portion of the character string for the purpose of editing only the characters, but displaying them in three dimensions. A second display allows a user to view and edit how the character string appears at a selected point in time or position along a path during a titling effect for the purpose of animation. In both of these displays, the text is displayed in a three-dimensional form. This interface may be combined with a timeline editing interface for editing an associated video program, or other user interface, to permit layering of titling effects and adjustment of animation properties and timing.

Accordingly, in one aspect, a computer-implemented method and computer system generates a representation of an alphanumeric character as a set of polygons defining a surface of the alphanumeric character. A computer program product containing computer program instructions for performing the method also may be provided. An input providing an indication of a character code identifying the alphanumeric character is received. Curves defining an outline of the alphanumeric character are identified according to the character code. A set of polygons defining a surface of the alphanumeric character are generated from the identified curves for the character code. The set of polygons may be generated by converting the curves into a set of connected line segments and tessellating the set of connected line segments to obtain the set of polygons. A user may define a path on which one or more alphanumeric characters is placed. The properties of the characters may depend on their positions along the path.

In another aspect, a method and computer system produces three-dimensional animation of alphanumeric characters. An input defining an outline of the alphanumeric character is received. Properties are associated with the character. A period of time during which the character is displayed or a path on which the character is placed may be defined. The properties associated with the character may vary according to the point in time in the defined period of time or the position of the character on the defined path. A set of polygons defining a surface of the character is generated using the received outline and properties. The set of polygons is rendered on a display according to the properties as specified over the period of time or along the path.

In another aspect, a graphical user interface for displaying three-dimensional animated alphanumeric characters receives an indication of an alphanumeric character. In response to a receipt of an indication of an alphanumeric character, a set of polygons representing the alphanumeric character is generated according properties associated with the alphanumeric character. The set of polygons is rendered on a display. The properties may be determined according to a position of the character along a path, or as a function of time.

Another aspect is a video program produced by the process of generating a three-dimensional model of animated characters along apath or over time.

BRIEF DESCRIPTION OF THE DRAWINGS

In the drawings,

FIG. 5 is a flow chart describing how the data structure shown in FIG. 3 may be processed to determine properties associated with each node in the structure;

DETAILED DESCRIPTION

The following detailed description should be read in conjunction with the attached drawing in which similar reference numbers indicate similar structures. All references cited herein are hereby expressly incorporated by reference.

Figure 1:
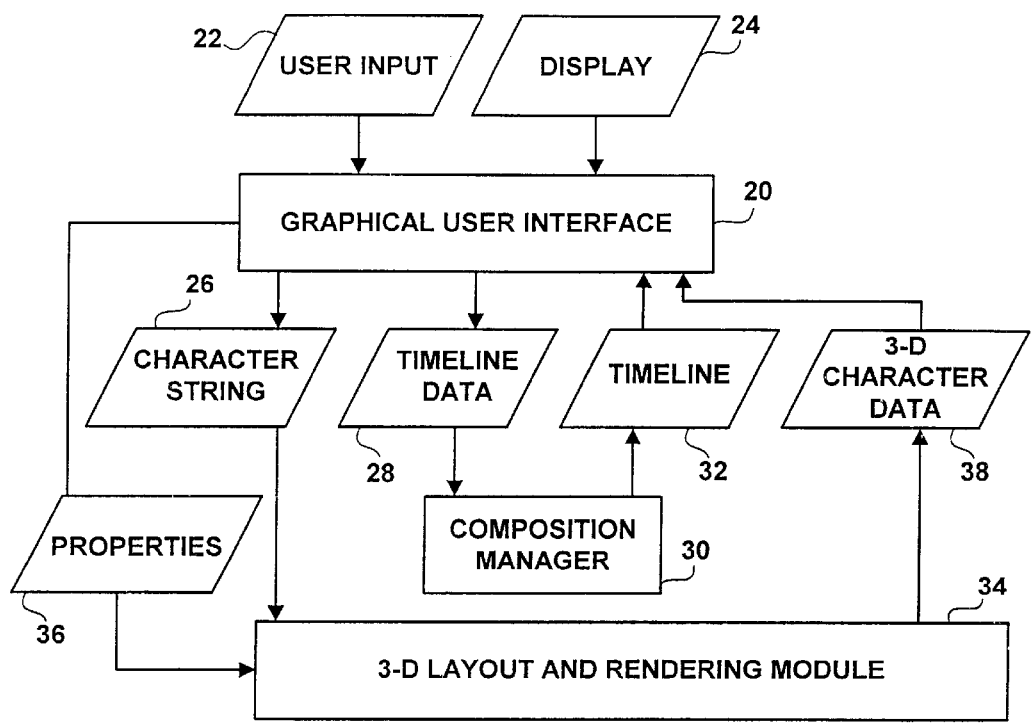
FIG. 1 is a data flow diagram of a system for three-dimensional character generation in combination with a video editing system in one embodiment.

Referring now to FIG. 1, a character generator may be used in conjunction with, or independently from, a video editing system. A character generator receives alphanumeric character input from which image data is generated to be applied to the video data. An alphanumeric character is a graphical symbol defining a letter, number, punctuation or other symbol in a written language. In an embodiment shown in FIG. 1, the character generator is provided in conjunction with a video editor, which enables titling effects to be created by an editor along with a video program. The video program ultimately may be delivered as film, videotape, digital or analog, high definition or standard definition television signal or may be reproduced on a computer screen and/or stored on a computer readable medium. In this embodiment, the character generator and video editing system have a graphical user interface 20 which receives user input 22 in order to edit a video program and to apply titling effects to the video stream.

The graphical user interface generates display data 24 for placement, for example, on a computer display (not shown). The display data may include video data based on images of a video program in which titling effects are applied. Various user interfaces, such as a timeline or menus, in combination with a cursor control device or other input device, enable a user to define the input 22 applied to the graphical user interface 20. The user may input information such as an alphanumeric character string 26 to be used in a titling effect applied to the video data. Manipulations to the timeline, as shown at 28, are provided to a video editing system 30 which maintains a representation of the video program being edited, commonly called a composition. The video editing system outputs data representing the timeline as indicated at 32 which is processed by the graphical user interface to be added to the display data 24.

The alphanumeric character string is input to a three-dimensional layout and rendering module 34. A character may be associated with properties 36 defining characteristics of the character such as a font, rotation, position, size, kerning and lighting. The three-dimensional layout and rendering module 34 uses the properties 36 and the alphanumeric character string 26 to generate a set of polygons defining the characters. The sets of polygons are rendered to produce three-dimensional character data 38 which is included in the display data 24 through the graphical user interface 20.

Figure 2:
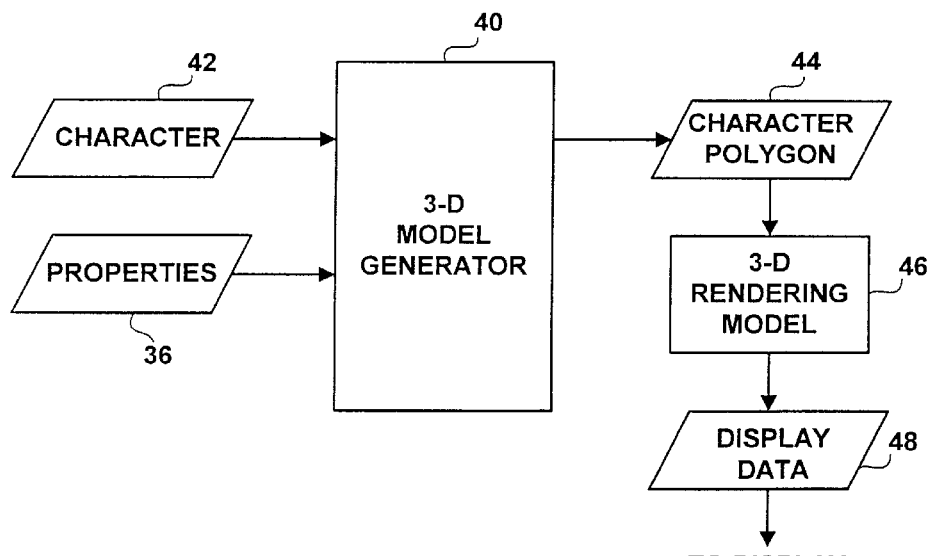
FIG. 2 is a more detailed data flow diagram of a system for generating and rendering three-dimensional models of alpha numeric characters.

Additional details of the three-dimensional layout and rendering module 34 are shown in FIG. 2. FIG. 2 illustrates a three-dimensional model generator 40 which receives an indication of an alphanumeric character 42 and the properties 36. There may be one or more alphanumeric characters 42 in the alphanumerical character string 26 in FIG. 1, which are rendered separately by the module shown in FIG. 2. Three-dimensional model generator 40 outputs a set of polygons 44 that defines the alphanumeric character in three-dimensions. This character is rendered using a three-dimensional rendering module 46 to produce the display data for the character 48. The display data for several characters is combined in a layout determined using standard techniques to produce the three-dimensional character data 38 in FIG. 1.

By representing a character as a set of polygons which is rendered in three-dimensions, rather than a raster image, several transformations may be performed on the character in real-time to provide a displayed output to the editor illustrating how the character appears in three-dimensions. Because the character is represented as a polygon, various pixellation or other visual artifacts are not created by the spatial transformations. The characters also may be animated over time or along a path and the animation may be defined in a resolution independent manner. Animation signifies varying any property, such as defined below, of three-dimensional object over time or along a path.

One embodiment of the system of FIG. 1 will now be described in connection with FIGS. 3–10. The system described herein creates a three-dimensional model which is rendered to produce the display data added to the image space. There are many ways to layout and to represent alphanumeric character strings, and the invention is not limited to those described herein. The following description provides an example implementation for representing a character as a set of polygons generated from a character code, font and other properties.

A computer system for implementing the system of FIGS. 1 and 2 as a computer program may include a main unit connected to both an output device which displays information to a user and an input device which receives input from a user. The main unit may include a processor connected to a memory system via an interconnection mechanism. The input device and output device also are connected to the processor and memory system via the interconnection mechanism.

It should be understood that one or more output devices may be connected to the computer system. Example output devices include a cathode ray tube (CRT) display, liquid crystal displays (LCD) and other video output devices, printers, communication devices such as a modem, storage devices such as disk or tape, and audio output. It should also be understood that one or more input devices may be connected to the computer system. Example input devices include a keyboard, keypad, track ball, mouse, pen and tablet, communication device, and data input devices such as audio and video capture devices. It should be understood that the invention is not limited to the particular input or output devices used in combination with the computer system or to those described herein.

The computer system may be a general purpose computer system which is programmable using a computer programming language, such as "C++," JAVA or other language, such as a scripting language or even assembly language. An example computer system is the Infinite Reality computer system from Silicon Graphics, Inc. The computer system may also be specially programmed, special purpose hardware, or an application specific integrated circuit (ASIC). In a general purpose computer system, the processor is typically a commercially available processor, of which the series x86 and Pentium series processors, available from Intel, and similar devices from AMD and Cyrix, the 680X0 series microprocessors available from Motorola, the PowerPC microprocessor from IBM and the Alpha-series processors from Digital Equipment Corporation, and the MIPS microprocessor from MIPS Technologies are examples. Many other processors are available. Such a microprocessor executes a program called an operating system, of which WindowsNT, Windows 95 or 98, IRIX, UNIX, Linux, DOS, VMS, MacOS and OS8 are examples, which controls the execution of other computer programs and provides scheduling, debugging, input/output control, accounting, compilation, storage assignment, data management and memory management, and communication control and related services. The processor and operating system defines computer platform for which application programs in high-level programming languages are written.

A memory system typically includes a computer readable and writeable nonvolatile recording medium, of which a magnetic disk, a flash memory and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk after processing is completed. A variety of mechanisms are known for managing data movement between the disk and the integrated circuit memory element, and the invention is not limited thereto. It should also be understood that the invention is not limited to a particular memory system.

Such a system may be implemented in software or hardware or firmware, or a combination of the three. The various elements of the system, either individually or in combination may be implemented as a computer program product tangibly embodied in a machine-readable storage device for execution by a computer processor. Various steps of the process may be performed by a computer processor executing a program tangibly embodied on a computer-readable medium to perform functions by operating on input and generating output. Computer programming languages suitable for implementing such a system include procedural programming languages, object-oriented programming languages, and combinations of the two.

It should be understood that invention is not limited to a particular computer platform, particular processor, or particular high-level programming language. Additionally, the computer system may be a multiprocessor computer system or may include multiple computers connected over a computer network. It should be understood that each module or step shown in the accompanying figures may correspond to separate modules of a computer program, or may be separate computer programs. Such modules may be operable on separate computers.

In one embodiment, an OpenGL software library (OpenGL is a registered trademark of Silicon Graphics, Inc.) which is accessible through an application program interface (API), is used to implement commands that specify objects and operations to produce interactive, three-dimensional applications. In a computer system which supports OpenGL, the operating system and application programs can make calls to the computer graphics system according to the standardized API without knowledge of the underlying hardware. The OpenGL standard provides a library of graphics manipulation commands for describing models of three-dimensional objects. The OpenGL standard is described in the *OpenGL Programming Guide,* Version 1.1 (1997), the *OpenGL Reference Manual,* Version 1.1 (1997), and *The OpenGL Graphics System: A Specification* (Version 1.0), by Segal and Akeley, all of which are hereby incorporated by reference in their entirety.

Figure 3:
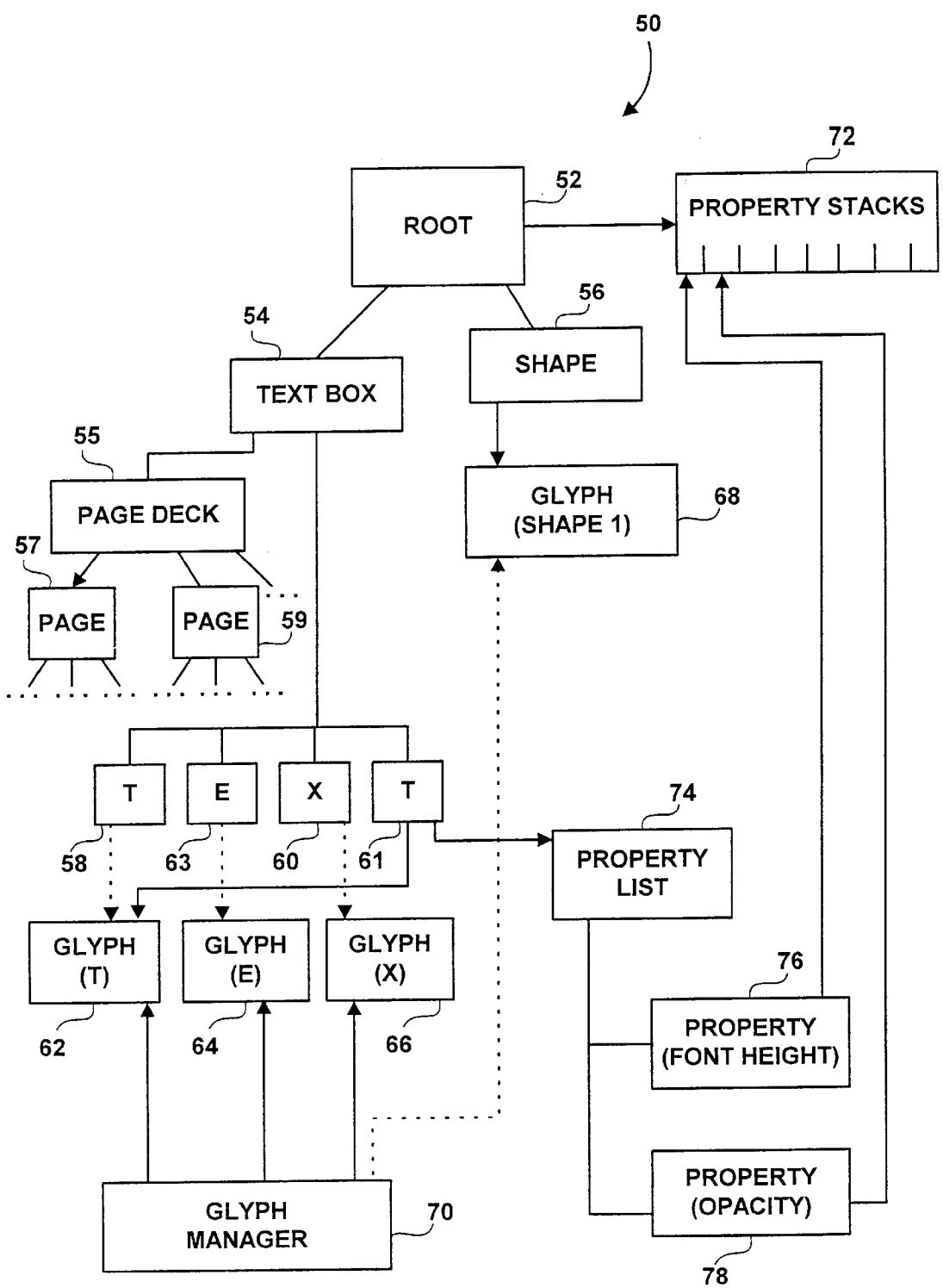
FIG. 3 is a graphical illustration of a relatiorship of data structures defining a titling effect to be applied to video.

Referring now to FIG. 3, in one embodiment a data structure which represents a titling effect to be applied to video is a scene graph. The implementation may be object oriented. The scene graph object may be implemented as a tree or other structure such as a list, array, etc. An example of such a tree is shown at 50 in FIG. 3. The tree has a root node 52. The root node has a collection of children nodes which may be, for example, a text box 54 or shape 56 or page deck 55. The root node also has associated with it a collection of property stacks which will be described in more detail below.

A shape object is any arbitrary closed two-dimensional shape, such as a rectangle, circle or triangle. Accordingly, a shape node 56 is represented by data defining the shape, such as a Bezier.

A text box object 54 is defined as a collection of characters, which may be representing using any data structure, such has a tree. A text box may be implemented to include other text boxes. A text box also has an associated property list, as described below. A text box, for example, may have width and height properties.

Another kind of object is a page deck object 55. A page deck is a collection one or more pages 57, 59. A page may include other kinds of objects such as text boxes, shapes or other page decks. A page deck has a display method that displays its children one at a time. A child is selected according to a function of time.

Each character object, such as shown at 58, 59, 60 and 61, is represented by a character code and a property list. The character code may be an ASCII code defining the alphanumeric character or symbol.

Glyph objects, illustrated at 62, 64, 66 and 68, are dynamically created from character and shape objects according to a code for a character or shape object and associated properties. A glyph defines commands which may be used to render a character on a display. Glyphs for different characters, but having the same font name, profile, and rendering mode may be combined into glyph sets.

In one embodiment, a glyph is implemented as a display list in the OpenGL standard, which is created by rendering the set of polygons defining a character or shape, such as described below in connection with FIG. 5. By using a display list, three-dimensional rendering of a set of polygons may be accelerated by caching the display list for the character as a glyph. Such caching is maintained by a glyph manager 70.

The glyph manager 70 is a repository, such as a database or a data structure, that stores glyphs created for a combination of character code, font, profile, and rendering mode and a level of detail. Fonts with different style attributes that alter the outline of the character, such as bold and italic, are treated as separate fonts. The profile corresponds to beveling or other border properties that also alter the outline of the character. The rendering mode includes wire frame or non-wire frame rendering. The level of detail (LOD) represents a particular polygonal tessellation of the glyph. Glyphs having the same font, profile, rendering mode and LOD are combined into a glyph set. A glyph set may include a glyph for characters in a specified font with a specified profile, rendering mode and level of detail.

Figure 4:
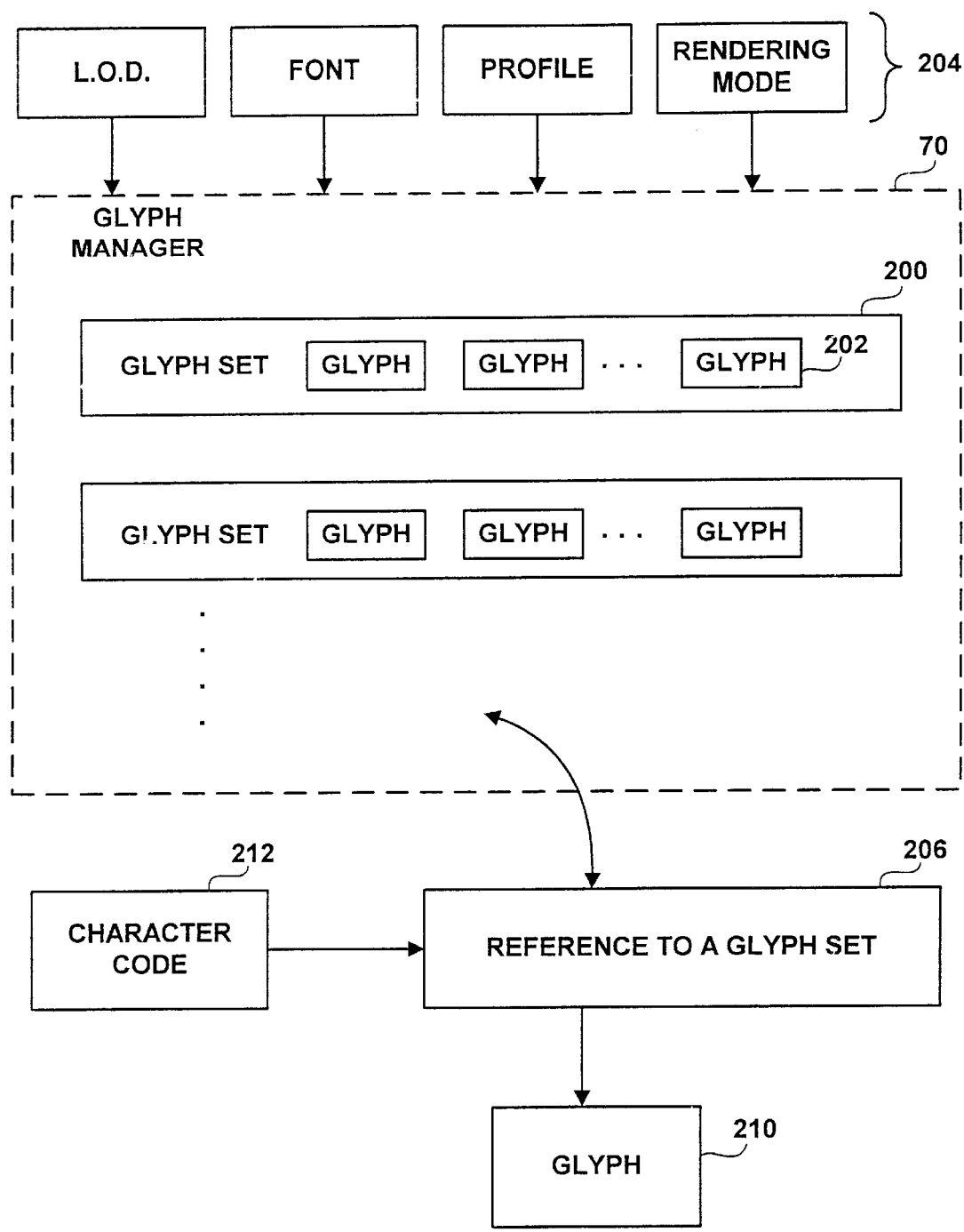
FIG. 4 is a data flow diagram of a glyph manager shown in FIG. 3.

Referring now to FIG. 4, the glyph manager 70 stores glyphs 202 in glyph sets 70. An indication of a font, profile, rendering mode and LOD 204 identify a glyph set. In response to an indication of a font, profile, rendering mode and LOD, a glyph set 200 may be identified or maintained by the glyph manager. A reference or pointer to a glyph set may be returned by the glyph manager as shown at 206. To retrieve a glyph 210 from a glyph set 200, a character code 212 and the reference 206 to the glyph set are used. In one embodiment, the glyph set may be implemented as an object having a draw method that is passed an indication of a character code. Given the character code, the glyph set draws the glyph for the indicated character code. In a computer system such as a described above, in particular the Infinite Reality computer system, an entire glyph set 200 may be loaded into a memory associated with the graphics processor in order to accelerate rendering.

Properties are values which control the appearance and position of nodes in a scene graph. These values may be animated in a video presentation. In particular, the value of a property may be a function of time or may be a function of position of the object along a path. There are several kinds of properties that may be associated with an object, which may be grouped together in any number of ways. Material or surface properties are used to color an object. Shadow properties define the color and nature of an object's shadows. Border properties define the material and nature of an object's border, such as an outline. Lighting properties define how lighting is directed at objects. Effect properties define special effect attributes for rendering the object. Font properties define the aspects of the font used for character objects. Transform properties define various spatial transforms applied to the object. Layout properties define how objects relate to each other. Some properties, as noted above, affect the glyph set in which a character belongs. Other properties, such as those that define affine transforms affect the projection of a rendered object onto a display. Using OpenGL, these properties may be used to alter the model-view matrix.

Example material or surface properties include color, opacity, shininess, texture pattern or image, texture mapping, lighting, overlapping, and features affecting textures, such as tiling, tinting, mapping, scale, offset and rotation. Example shadow properties include the type of shadow, shadow material, angle of the shadow, distance from the object, softness, color and opacity of the shadow. Example border properties include the type, such as outline or bevel, material, thickness and bevel smoothness; Example lighting properties include direction, offset, color, intensity and size. Example effect properties include delay indicating a time of wait until a next object is drawn, any transition used to place the object on a screen, such as a dissolve or wipe, the depth of extrusion, whether objects should be rendered as wire frames, or other information. Example font properties include the font family such as Times or Helvetica, or font name, the font size, and style attributes such as bold, italic and underline. Example transform properties include the position relative to any parent object in the scene graph, the center of rotation and scaling with respect to the position, an amount of scaling and amount of rotation, and any anchor point. Such transform properties may be specified in any coordinate space, such as Cartesian coordinates. Example layout properties include the amount of additional kern between objects, the amount of additional leading above objects, the justification or alignment, margins, and scroll position.

For each type of property, a property stack is maintained. The list of stacks 72 is to maintained as part of the root object 52. A stack is used to track the active properties for a node during traversal of the scene graph. Each node in the scene graph may have a property list such as shown at 74. A property list is a list of properties and associated values for each node which differ from default values in the property stacks associated with the root node. If a property is not in the property list of a given node, the property is inherited by that node from any ancestor node in the scene graph. If a node has a property in its property list, that node overrides the property value from the ancestor nodes. For example, property list 74 includes values 76 for font height and 78 for opacity. However, it does not include a value for the property font type. Therefore, node 61 inherits its font type from ancestor nodes text box 54 or root 52, but overrides the font height and opacity values. Each character also may have its own properties that is may inherit or that it may define as a ftnction of time or position along a path.

A property value may be defined by a function based on a normalized representation of time that refers to the duration of the scene graph. In particular, the property values may be defined as a function of time, where time ranges in value from zero to one. This function may be represented by a Bezier curve. Different values may be associated with the property over time to permit animation of the property. In a graph of a property value, where a horizontal axis represents time and a vertical axis represents a value, a constant value is represented by a horizontal line. A graphical user interface that displays the Bezier curve may permit a user to manipulate the curve to change these values.

A property value also may be defined by a function based on a normalized position of an object along a defined path. The position of objects, such as characters, along the path may be animated over time. In particular, the property values may be defined as a function of a position along the path, where the position ranges in value from zero to one. The path may be represented by a Bezier curve. Different values may be associated with a property along the path to permit animation of the property. In a graph of a property value, where a horizontal axis represents a position along the path and a vertical axis represents a value, a constant value is represented by a horizontal line. A graphical user interface that displays the Bezier curve defining the property may permit a user to manipulate the curve to change these values.

A path may be specified in a text box object as a path object. A Bezier curve may be used to define a path. Other structures also may be used to defined paths. In addition to the structure used to defined a path, a path object has at least two properties: a baseline offset and an orientation. Baseline offset, described in more detail below, specifies an offset of the characters of text from the path. The orientation specifies the direction of the text characters on the path. For example they may be oriented vertically, or perpendicular to the path or parallel to the path. A path may be specified by a user using standard techniques for defining curves in three-dimensions.

The position of the text on the path is based on whether the text is static on or scrolls along the path. If the text is static on the path, the text may be aligned along the path, for example by being left aligned, center aligned, right aligned, justified, or equally spaced. If the text is scrolled along the path, a scroll position property may be defined to vary over time specified for the text. A scroll position indicates an offset from a start of a path. For a rectangular path, the start of the path is the upper left corner. For elliptical paths, the start of the path is the top of the ellipse. For all other shapes, the start of the path is the first control point created to define the shape defining the path.

As noted above, text also may be offset from a path. For example, a baseline offset value may indicate the position from the path of the location of the text. A value of zero for the baseline offset indicates that the text is exactly along the path. Values greater than zero shift the text above the path, whereas values less than zero shift the text below the path. The position of a character along a path generally is independent of the offset. The offset for a character may be independent of or a function of the position along the path.

As mentioned above, when processing the scene graph either to position characters or to render characters, the properties associated with a node are pushed onto the property stacks when processing that node and its children. After completion of the processing of a node and its children, the properties are popped from the property stacks.

In order to process a scene graph and in order to display its contents, the scene graph is traversed using a simple "in order" or "depth first" traversal. The graph may be first traversed to perform a layout function, i.e., positioning of characters. Where the text is placed along a path, the layout is described in more detail below in connection with FIG. 10. The graph may be next traversed to draw each character on the display or to an image buffer. A process for traversing the tree to identify the property values for each node and character in the tree will be described now in connection with FIG. 5.

FIG. 5 illustrates pseudocode for implementing this procedure. The procedure begins with processing of the root node, which has associated property stacks. The root node has its own property list that defines system-wide default values. The property list also may be changed to provide values which differ from system-wide default values. For each property in the node's property list, the property is pushed onto the corresponding property stack in step 50. The node is then processed, to either layout or draw the contents of the node in step 52. For each child of the current node, as determined in step 54, this procedure is recursively performed as identified at 56. After completing processing of all the child nodes, for each property in the property list of the current node, as determined in 58, the property values are popped from the corresponding property stacks in step 60. This process of referencing properties by a property stack during tree traversal implements property inheritance and overriding.

In order to display the contents of a text box, two functions are performed. First, the text is laid out in a plane or space defined by its parent node, by selecting position for each character based on the spatial properties of the character. The characters may be laid out along a path in this plane or space, and the spatial properties of a character (as well as other properties) may vary with its position along the path. Processes for laying out characters of the same size and orientation in two-dimensions are well-known in the art. A process for laying out characters along a path where the positions of the characters along the path affect their properties (in particular, size, orientation and other spatial properties) is described in more detail below in connection with FIG. 10. The characters are then drawn in their selected positions. The plane or space into which the characters are drawn may be transformed for display. The layout and drawing operations may be performed for each character separately or for all characters in a string at one time.

Figure 6:
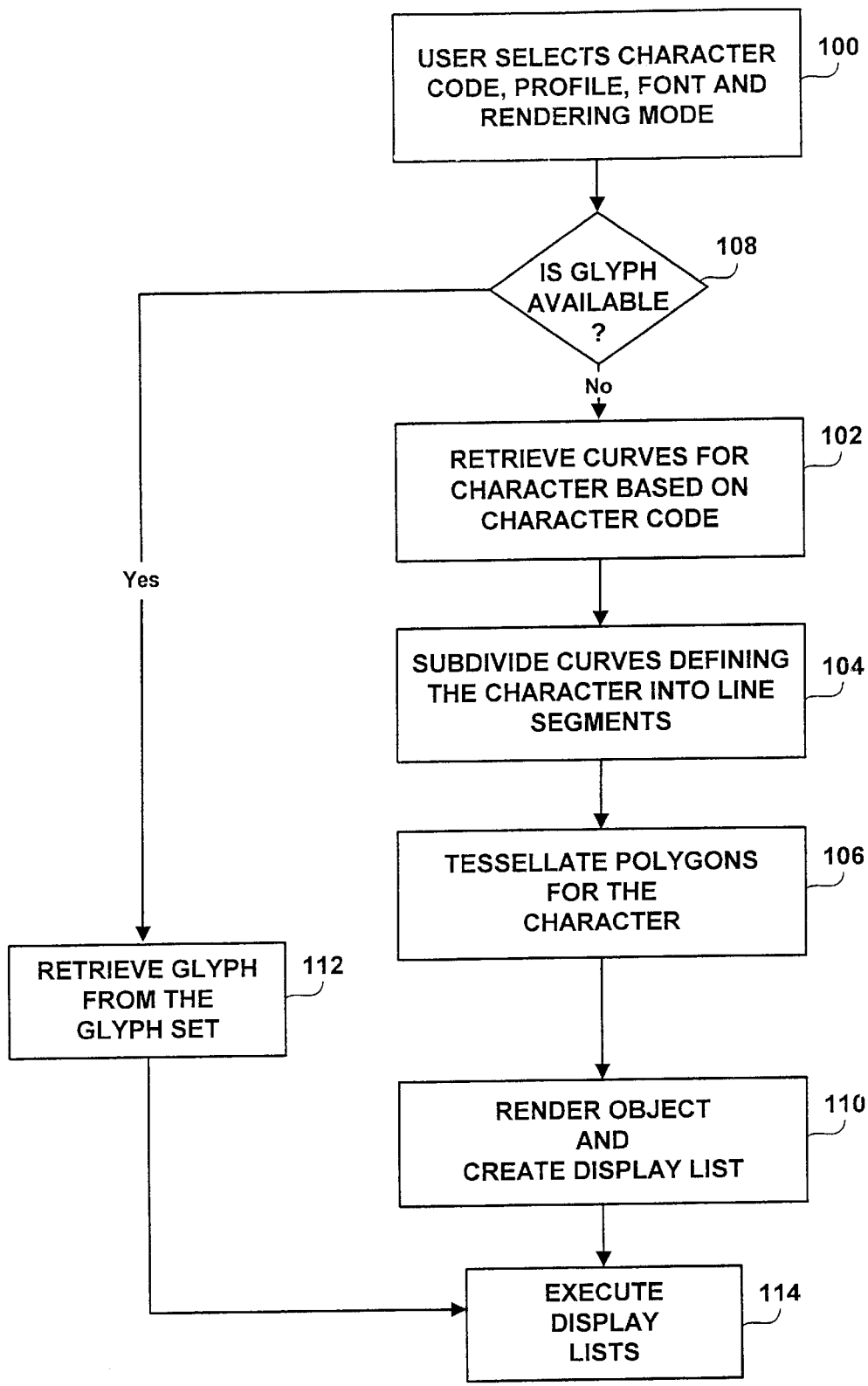
FIG. 6 is a flow chart describing how a character may be rendered.

The drawing of three-dimensional text characters represented by polygons will now be described in connection with FIG. 6. FIG. 6 is a flow chart describing the process of rendering a character. This process begins by a user specifying a character code, font, profile and rendering mode in step 100. The font, profile and rendering mode may be selected from the property stack at the node for this character.

As described above, the character node defines a character code representing the character, such as a Unicode value, a standard maintained by the Unicode consortiumn, an ASCII code, or a code defined in ISO-8859-1 (Latin), ISO-8859-7 (Greek), ISO 8859-5 (Cyrillic), ISO-8859-8 (Hebrew), or ISO 8859-6 (Arabic), or any other character code standard. Type 1 fonts (from Adobe Systems, Inc.), TrueType fonts (from Microsoft Corporation) and Bitstream fonts (from Bitstream, Inc.), or any other font defined by contour definitions, for example by using Bezier splines, may be used.

A glyph may be available for the specified character, font, profile and rendering mode in the glyph manager 70. If it is determined in step 108 that a glyph is available in the glyph manager for the specified character, the glyph is retrieved in step 112 from the glyph manager. The glyph is then executed in step 114.

If a glyph is not available for the specified character, font, profile and rendering mode, the contours or curves defining the character in the specified font are retrieved using the specified character code, in step 102.

The curves defining a character are then subdivided in step 104 into a set of line segments. The subdivision of Bezier curves is described, for example, in *Computer*

*Graphics Principles and Practices,* Second Edition, by James D. Foley, Andries van Dam, Stephen Finer and John Hughes, Addison-Wesley Publishing Company, 1990, pages 507–511, which is hereby incorporated by reference. The set of line segments define an outline of the character.

Changes in the height and size of a character may affect the number of polygons created by tessellation (in the next step 106 in FIG. 6) in order to make the resulting image look smooth. In particular, small characters have a low level of detail and few polygons. Large characters have a high level of detail and many polygons. The level of detail may be increased by recursively subdividing the line segments according to a desired level of detail. Such recursive subdivision often is used to improve accuracy of an approximation of a polygon to a surface. Such subdivision techniques are described in the *OpenGL Programming Guide,* Version 1.1, Second Edition, pp. 86–89, which is hereby incorporated by reference. A particular embodiment for determining a desired level of detail is described in more detail below in connection with FIG. 7. The line segments obtained by subdividing the curves are continually subdivided if two adjacent line segments have an angle that exceeds a threshold determined by the desired level of detail.

The polygons defining the outline of a character are then tesselated in step 106. Tessellation is a function provided by the OpenGL application programming interface. This function may be used with a parameter "glu_tess_tolerance," which is set to zero. Tessellation fills spaces defined by the line segments with polygons, typically triangles, and lines, to provide a set of polygons defining a shape of a character. The set of polygons resulting from tessellation then may be rendered in step 108. If rendered using OpenGL, a display list may be created and stored in the glyph manager. The display list may be executed in step 114.

Prior to tessellating the polygons defining a character, a two-dimensional outline of a character may be transformed into a solid three-dimensional object by applying a profile to the character outline. A profile is defined in a plane perpendicular to the plane of the two-dimensional outline. The computer system sweeps the profile along the character outline to produce a three-dimensional shape. These techniques of profiling and sweeping are standard three-dimensional modeling techniques. For example, a circular profile produces a three-dimensional tubular character after sweeping.

Figure 7:
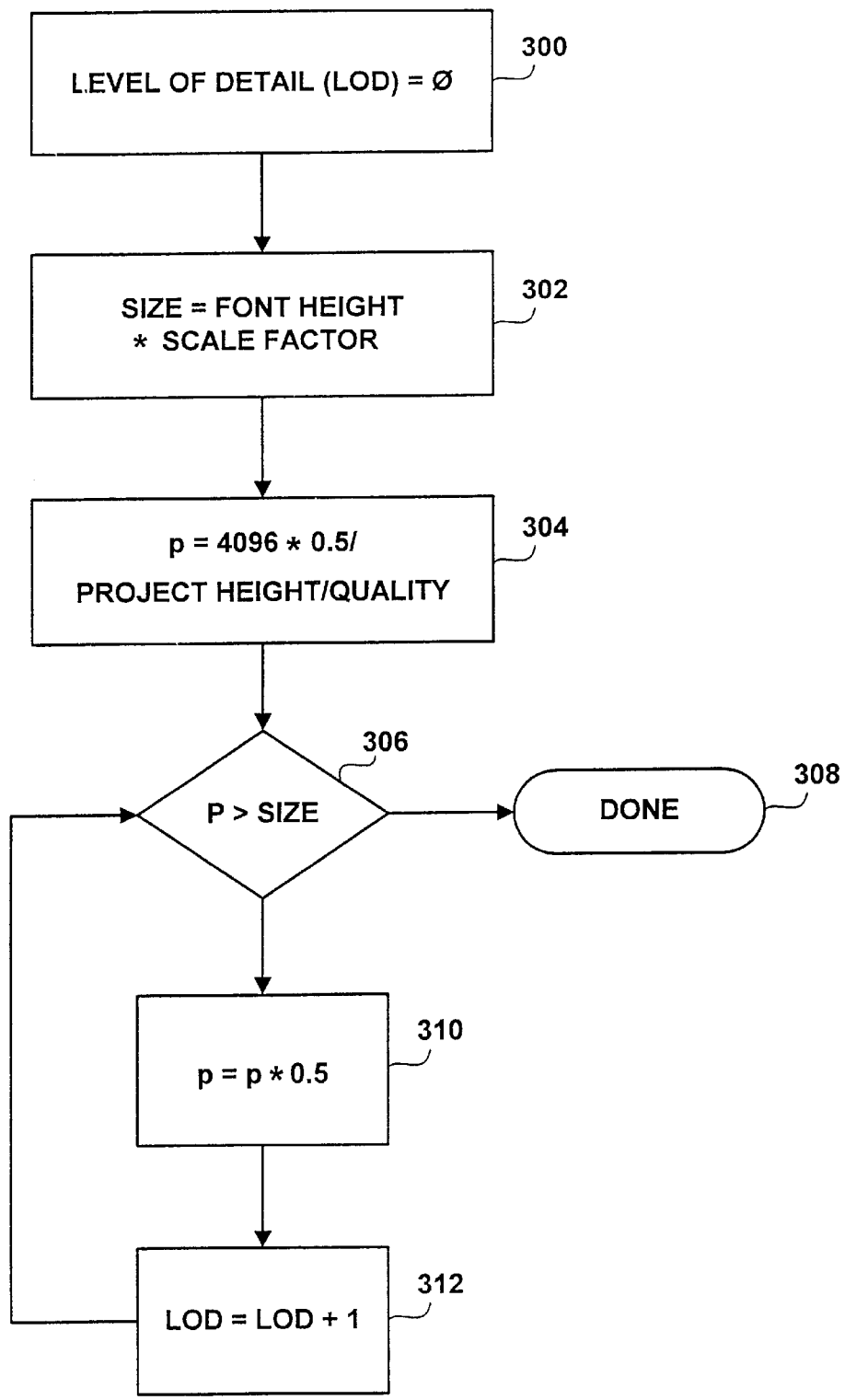
FIG. 7 is a flow chart describing how a level of detail may be selected for defining a set of polygons to represent a character.
Figure 8:
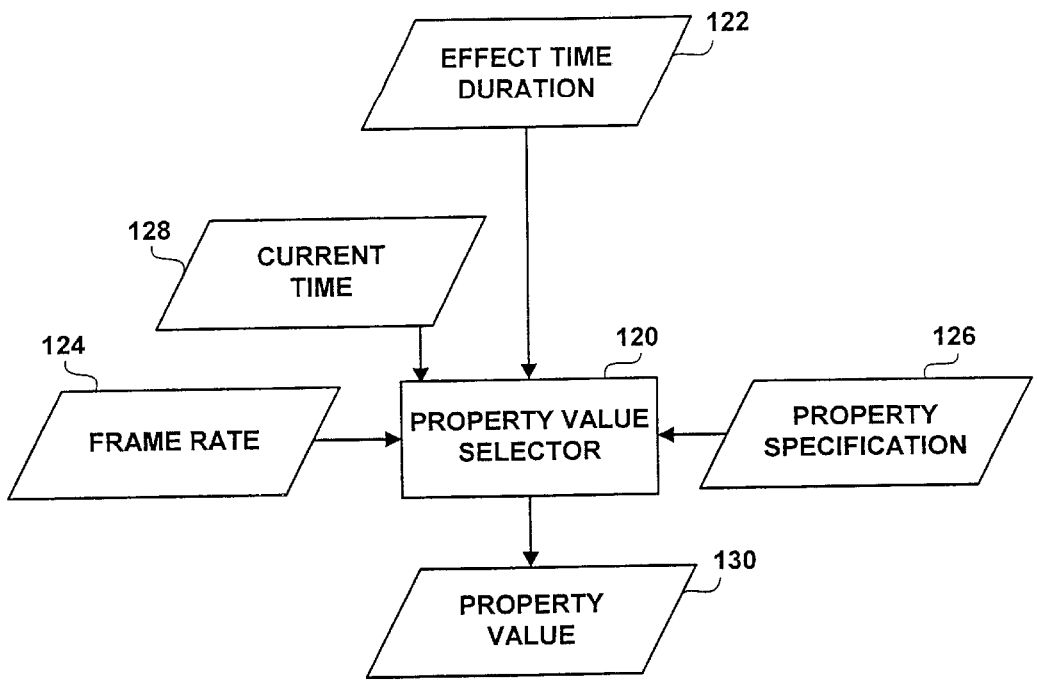
FIG. 8 is a data flow diagram illustrating how a property value may be selected for a given frame of an effect according to a point in time in the effect.

Referring now to FIG. 7, the determination of the threshold used to control subdivision of line segments in step 104 of FIG. 6, is based on a value representing a level of detail. In particular, the tolerance value (T) is equal to two to the power of the level of detail (LOD) value ($T=2^{LOD}$). In this embodiment, level zero is the maximum level of detail. Increasing integers correspond to lower levels of detail. The tolerance depends on the size of the resulting image in pixels, the height of the font, relative to the project height, any scaling factor, and a user provided value of quality. This value may be provided as any value greater than zero, where one is a nominal quality, or default value.

In the embodiment shown in FIG. 7, the determination level of detail is based on the following assumptions; the font height is a value of zero to one and is relative to the project height; the project height is measured in pixels; and the scaling factor by which Bezier curves are input into the system is 4096. The scaling factor allows polygon vertex values to be two byte scaled integers.

A first step of computing the level of detail is setting the level of detail value to zero in step 300. A size value is then computed as the product of the font height and the scale factor in step 302. A value called "p" is the Bezier curve scaling factor, e.g., 4096, multiplied by one half, then divided by the project height, and then by the quality value in step 304. If the value p is greater than the size value, as determined in step 306, processing is completed as indicated at 308 and the current level of detail value is used to compute the tolerance for the subdivision process. Otherwise, the value p is multiplied by one half in step 310 and the level of detail value is incremented in step 312. Steps 306 through 312 repeat until the value p is greater than the size value.

It should be understood that other methods may be used to determined the tolerance to which the subdivision step of 104 uses, and that this invention is not limited to the example embodiment set forth herein.

The properties for a scene may be animated over time. In order to determine a particular value to be used in a given image of a sequence of temporally related images, the property selected for example by using a property value selector shown at 120 in FIG. 8. An image may be a frame or a field. The property value selector receives an effect time duration 122 which is defined by an editor using for example the video editing system to apply the effect to one or more video tracks. The image rate of the associated video is also input at 124. The property value is defined by a property specification 126 which may be a Bezier curve having values associated with a time scale ranging from zero to one. The property value selector 120 multiplies the effect time duration by the image rate to determine the number of images over which the effect is applied. The ratio of the current time (in images with respect to a start image) to the total number of images in the effect defines a time value between zero and one which is used to identify a property value 130 according to the property specification 126. For any given image, property value 130 is used to define the displayed characters.

The properties for a scene also may be animated according to the position of each character along a path. Path dependent property values may be specified in a similar manner as time dependent property values. The same interface may be used for defining the property values over both time and position. The properties to be varied are associated with the path to which they are applied. Accordingly, a Bezier curve may be used, for example, to represent the dependency of a property on a position along a path. An interpretation of these values as either property or time dependent may be specified using a rendering mode having two states: time or position. Some values may be defined as path dependent. Others may be defined as time dependent. Others may be defined so as not to vary.

For static and aligned text along a path, the position of a particular character may be determined once for the duration of the effect. A path also may have scroll property that varies over time. The scroll property may be defined in the same manner as other time dependent properties. Given the calculation of the scroll position for a given image in a sequence of temporally related images, the characters may be laid out according to the scroll position and their position dependent properties.

Figure 9:
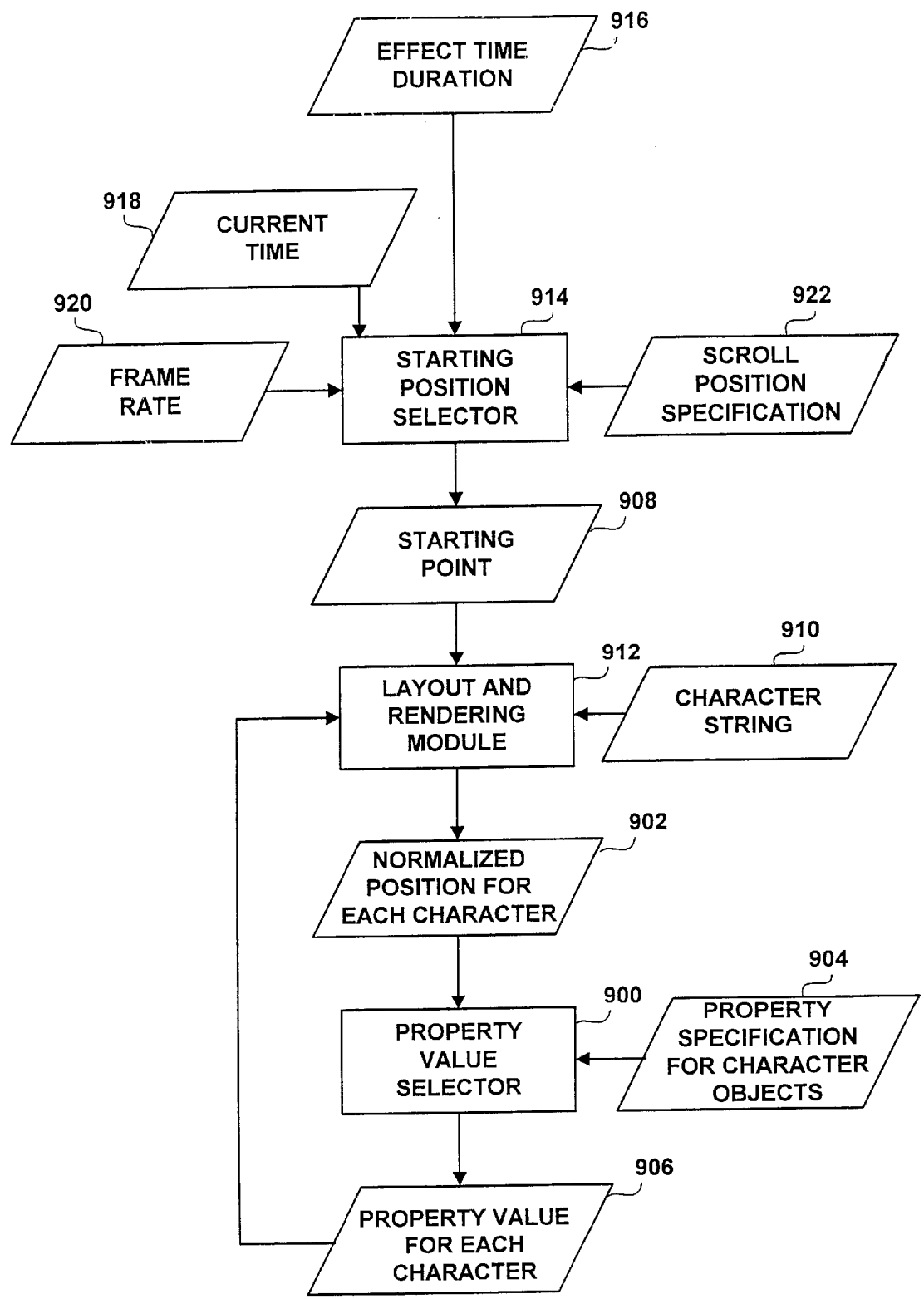
FIG. 9 is a data flow chart illustrating how a property value may be selected for a given character, according to the position of a character along a path.

Referring now to FIG. 9, how various properties for a character may be animated according to the position of the characters on the path will now be described. To determine which value for a property to use for a character in an image of a sequence of temporally related images, the property is selected, for example by using a position-based property value selector 900 as shown in FIG. 9. The position based property value selector 900 receives a normalized position 902 for each character laid out on the path. Each character may have its own properties defined in this manner to override inherited properties. The property value 906 for the character is selected according to the normalized position 902 from a property specification 904 defined for character objects or the path object. The normalized position 902 represents a value from zero to one along the path. The property specification generally has values associated with a position scale ranging from zero to one. This property specification may be the same property specification 126 (FIG. 8) that has values associated with a time scale ranging from zero to one, but used for a different purpose.

The normalized position 902 is determined by a layout module 912 using a starting point 908 for the character string to be placed on the path and the character string 910. The starting point 908 is determined by a starting position selector for 914, that uses the effect time duration 916, current time 918 and frame rate 920 as described above in connection with FIG. 8 with a time dependent scroll position specification 922. If the text is to crawl or otherwise scroll along the path, then the scroll varies according to time and is computed for each image in a manner similar to other properties described above in connection FIG. 8. Otherwise, the starting point may be static. If the scroll node is static, the current scroll position is set to zero. If the path is a closed path, the current scroll position is determined by multiplying the effect time duration by the image rate to determine the number of images over which the effect is supplied. The ratio of the current time (in images with respect to a start image) to the total number of images in the effect is used to find a time value between zero and one defining the point in time at which the current image occurs in the effect. This ratio is multiplied by the path length to obtain a current scroll position. If the curve is not closed, additional factors are applied to compute the scroll position to prevent edges of characters from being viewed if the scroll position is near zero or one. An example formula is expressed by the following equation:

scroll position=−(text width*1.01)+*t**(text width+path length)*1.005.

Because one of the properties of characters that may vary over time is size or any other spatial property, which in turn affects position, property values 906 for a character may be fed back to the layout and rendering module 912 to adjust a character's position. How characters in a character string are laid out given a path and starting point will now be described in more detail in connection with the flow chart of FIG. 10.

Figure 10:
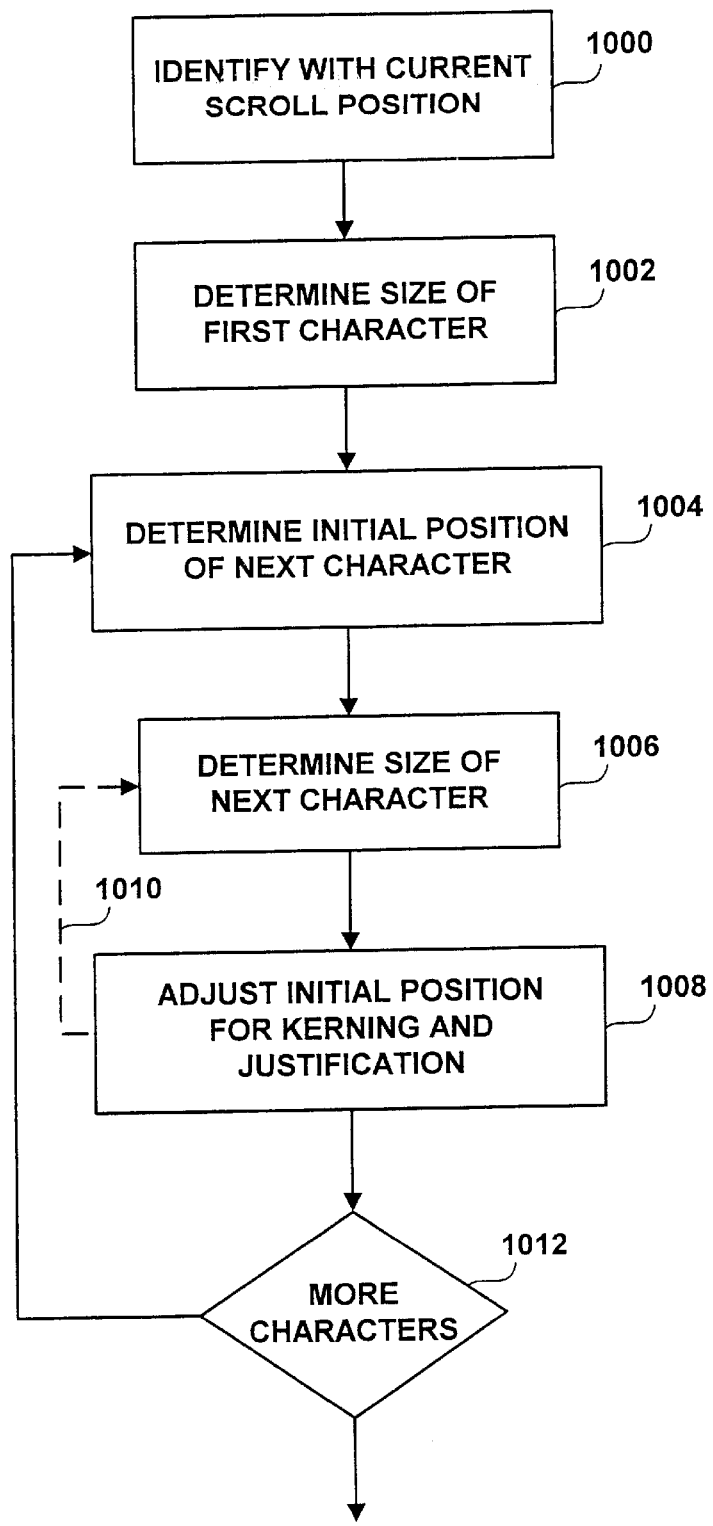
FIG. 10 is a flowchart describing how characters may be laid out along a path.

One difficulty in laying out text that is scrolling and has position dependent properties is that the width of text may be a function of its position, and its position similarly is a function of its width. To simplify this process, as shown in FIG. 10, the process begins by identifying the current scroll position in step 1000. This position is used to determine the size of the first character in step 1002. An initial position of the next character is determined in step 1004 by adding the width of the current character to the current position plus any spacing specified by kerning or justification. This position is used to determine the size of the next character in step 1006. The initial position of the next character is then adjusted in step 1008 such that the distance specified by kerning or justification between this character and the previous character is maintained. Steps 1006 and 1008 may be repeated until the adjustment amount is below a specified threshold as indicated at 1010. The orientation of the character on the path is determined by calculating the tangent to the path at the determined position. If more characters remain to be laid out as determined in step 1012, the process continues by repeating steps 1004 through 1012. Otherwise the process is completed on processing the last visible character on the path. If the path is closed, all characters are displayed. If the path is open, and if the current position of a character is defined by reference to the path, whether a character is on the path may be readily determined from its determined position. It should be understood that a standard linear layout of characters may be used where none of the position dependent properties affect the width or spacing between characters.

Figure 11:
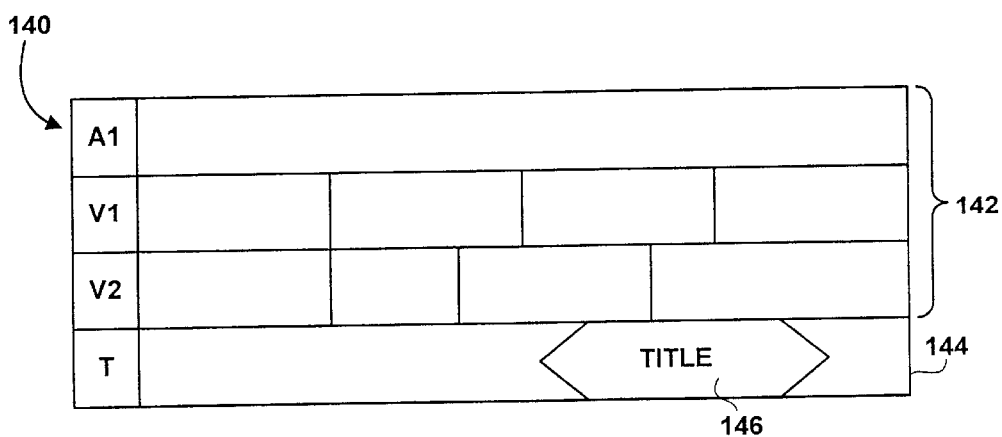
FIG. 11 is an illustration of a graphical user interface for a timeline.

Having now described the operation of the three-dimensional layout and rendering module 34 (FIG. 1), the graphical user interface 20 will now be described in more detail. It should be understood that the following is only an example interface and that many other user interfaces may be provided for editing text for use in rendering three-dimensional titling effects. A timeline 32 (FIG. 1) is shown in FIG. 11 at 140. The timeline may have one or more video or audio tracks 142 as is commonly provided in computer-based non-linear editing systems such as the Avid/1 Media Composer from Avid Technology, Inc. A titling track 144 also is provided to define titling effects or other character generation effects. A titling effect on the timeline, such as shown at 146, has a duration which may be adjusted by manipulation of the user interface using known techniques. The duration of the titling effect on the timeline interface may be maintained in a composition representing the program and may be used as described above in connection with FIGS. 8 and 9.

Figure 12:
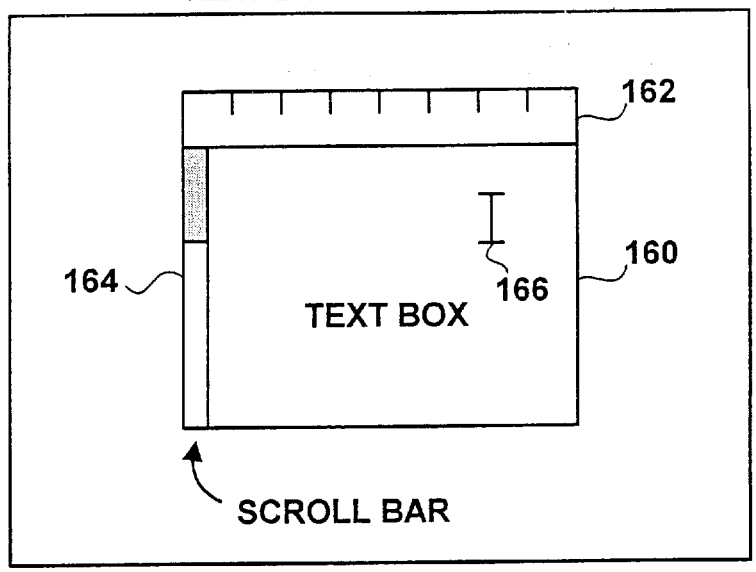
FIG. 12 is an illustration of a graphical user interface for editing and viewing three-dimensional characters.
Figure 13:
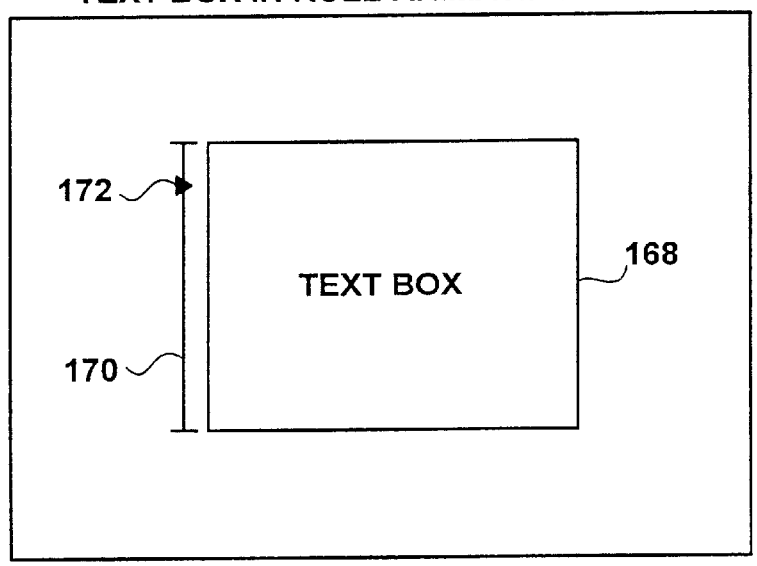
FIG. 13 is an illustration of a graphical user interface for viewing three-dimensional characters in roll animation.

If an icon for a text box is selected in the timeline shown in FIG. 11, an editing box may be provided to edit the text in the text box as shown in FIGS. 12 and 13. In particular, the graphical user interface for editing text in a text box may operate in two modes.

In a first mode, shown in FIG. 12, the text display area 160 is similar to a word processor. A ruler tool 162 may be used to identify spacing of the text. A scroll bar 164 may be provided to view text that does not fit within the text display area 160. A cursor 166 may be provided in this editor. The characters actually displayed in text display area 160 may be rendered using the three-dimensional techniques described above to provide a "what-you-see-is-what-you-get" (WYSIWYG) interface, without positioning in the text display area 160 that is effected by rolling or crawling. This mode may be activated by, for example, selecting the text display area 160 using a pointing device, such as a mouse.

In response to a user selecting an area outside of the text display area with the pointing device 160 or providing a predetermined input, such as a specified key on the keyboard, an alternate mode for the purpose of animation is shown, as illustrated in FIG. 13. In this mode, the display area 168 displays the text, with three-dimensional rendering as it appears at a selected time in the effect with spatial effects, such as rolling or crawling applied. The selected time in the effect is defined by a key frame control 170. The key frame control defines a range from zero to one over the effect. A point in time in the effect, to have rendered in the display 168, may be selected using a key frame indicator 172. Alternatively, the key frame control 170 may be horizontal or vertical in another position, or in another orientation, to allow key framing of a roll or crawl or other effect position.

Because a character is represented by a set of polygons instead of a bit-map, a character maybe manipulated using three-dimensional animation techniques. Animation properties that use a normalized scale over time permits animation that is independent of the spatial and temporal resolution of the video to which the animated characters are applied.

The storage of sets of polygons created from contours defining characters in a font defines a new representation of the font and allows new fonts to be created. The sets of polygons for characters of various fonts may be stored both to improve performance and for later retrieval to avoid recalculation.

Figure 14A:
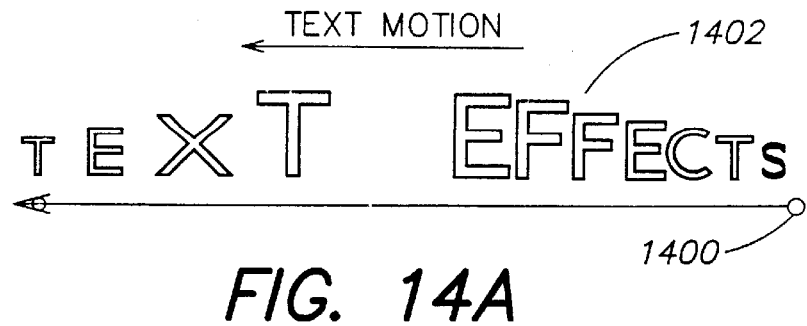
FIG. 14 is an illustration of position dependent animation of scaling of text.
Figure 14B:
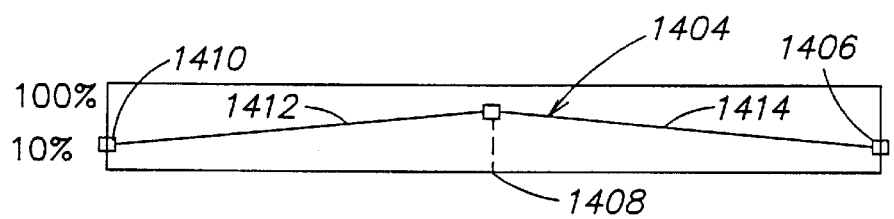

Example position dependent animation of objects on a path will now be described in connection with FIGS. 14 and 15. FIG. 14 illustrates how the size of text may be modified with position along the path. FIG. 14 shows a path 1400 on which the text "text effects" 1402 is laid out. As the text moves from right to left, the size of each character changes. For a given image in the effect, the position of each character, such as the "x," is dependent upon the curve 1404 specifying the object size. This scale function curve 1404 specifies 10% scale at position 1 (at 1406), a 100% scale at position 0.5 (at 1408) and 10% scale again at position 0 (at 1410) with linear ramps 1412 and 1414 between these three points.

Figure 15A:
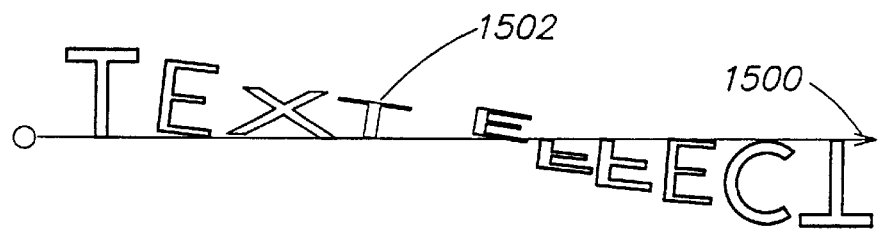
FIG. 15 is an illustration of position dependent animation of y-axis rotation of text.
Figure 15B:
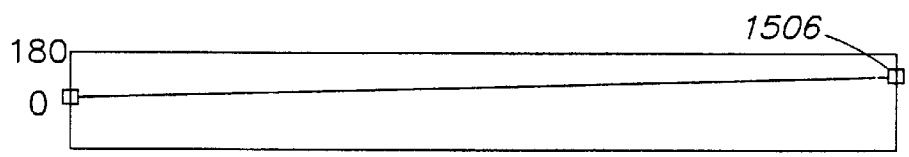

FIG. 15 illustrates a rotation in the Y axis. The path 1500 has associated with it the characters "text effect," at 1502. As the text moves from left to right, the orientation of each character changes. A rotation from 0–180° is specified linearly by the property curve 1506. For any given character, such as the "x," its rotation in the y-axis is determined by identifying the position along the path 1500, from which its corresponding rotation value can be determined 1506.

It also is possible to specify a second path associated with a first path that determines the height of each text object by the distance between the two paths. Such paths may have various configurations. For example, the paths may be parallel or non-parallel. In either orientation, each character may be placed along and between the paths (i.e., parallel to the path). Alternatively, the text may be laid out perpendicular to and between the paths.

Figure 16A:
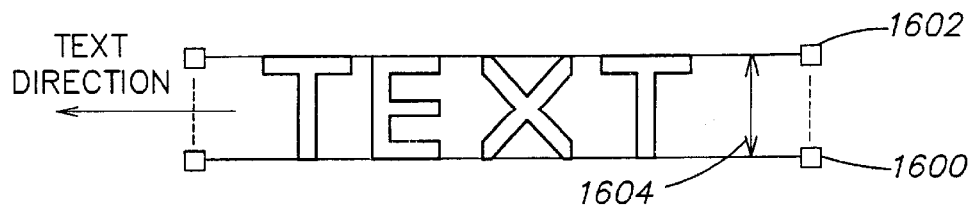
FIGS. 16A–16C are illustrations of text on two parallel paths with a horizontal orientation.
Figure 16B:
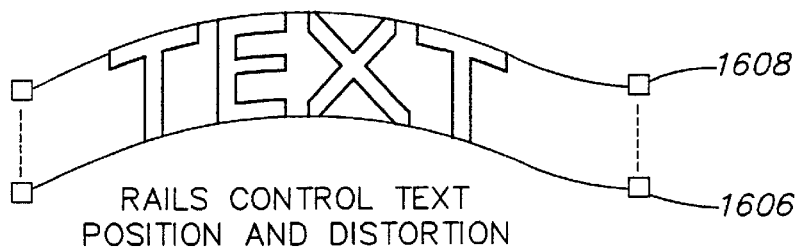
Figure 16C:
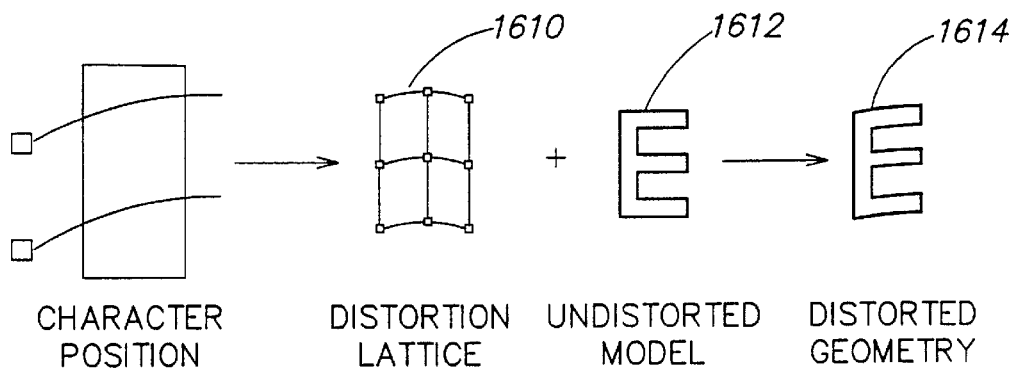

Parallel paths 1600 and 1602 are shown in FIGS. 16A and 16B. In these embodiments, the text may be laid out linearly because the height 1604 of each character is not position dependent. If the paths are not straight lines, such as shown at 1606 and 1608 in FIG. 16B, the position of each character may be used to determine a distortion lattice for the character. Such a distortion lattice may be generated by subdividing and transforming a rectangle defined about the character's position along the paths. In particular, a tangent at the position of the character along the path is computed. A box having a base along this tangent to the path at the character's position is defined. A segment of the path having end points defined by a projection of the box on the path is then used to transform the box to provide the distortion lattice. Such a distortion lattice, 1610 in FIG. 16C, may be combined with an undistorted model of the character 1612 to produce a distorted geometry 1614. The application of distortion lattices to three-dimensional models is well known in the art.

Figure 17:
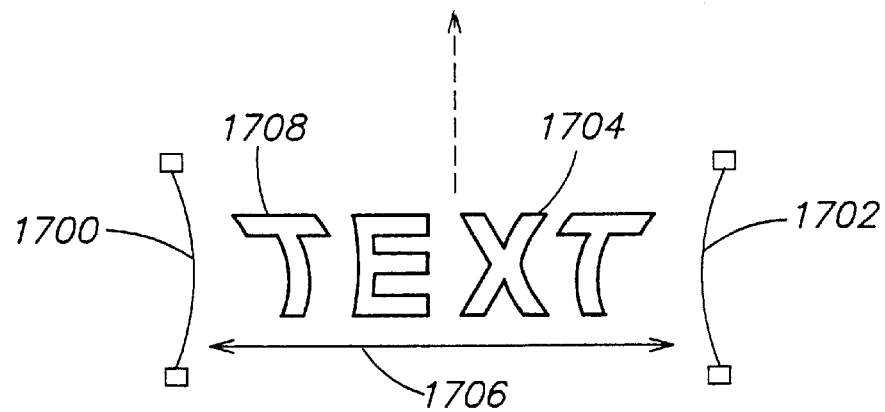
FIG. 17 is an illustration of text on non-parallel paths with a vertical orientation.

As shown in FIG. 17, text 1704 may be laid out perpendicular to and between two paths 1700 and 1702. The distance 1706 between the two paths may determine the size, i.e., the width, of each character of the text. Letters along the edges of the text, e.g., letter 1708, may be distorted according to a distortion lattice. The text may be laid out linearly if the text height is not position dependent. If the text height is position dependent, the text may be laid out in the manner described above in connection with FIG. 10.

Figure 18:
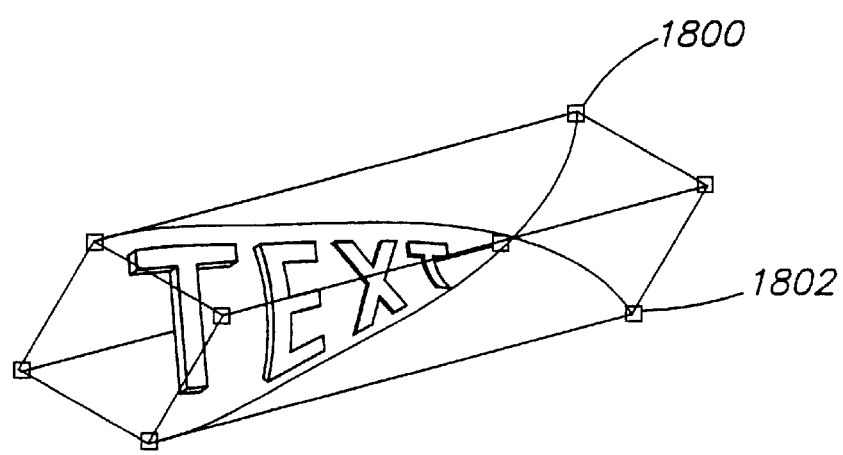
FIG. 18 is an illustration of text on non-parallel paths with a horizontal orientation.

Referring to FIG. 18, two non-parallel paths 1800 and 1802 also may be used to define scaling and rotation if the text is laid out along the path rather than perpendicular to the path. In this embodiment, scaling properties are determined by the angle of a line defining the shortest distance between a point on the bottom path and a point on the top half. In this embodiment, the width of a character is not position dependent because the height of the character is specified by the distance between the two paths. In this embodiment, the layout process described above in connection with FIG. 10 may be used with the following modifications. After an initial a position for a character is determined, the character's height at that position is determined from which its width may be determined. The position may be adjusted such that the spacing between characters remains accurate. Alternatively, the aspect ratio of the character may be adjusted as part of defining a distortion lattice for the character at that position.

It should be understood that there are many ways to specify one or more paths and how text may appear along one or more paths. The foregoing illustrations are merely examples of the kinds of effects that may be made by using time and position dependent properties of text characters.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method for producing three-dimensional animation of an alphanumeric character string along a path, comprising:

interactively receiving, data indicating chances to the alphanumeric character string;

receiving an input defining a position of they alphanumeric character string along the path as a function of time;

receiving an input defining a three-dimensional model of each alphanumeric character in the alphanumeric character string;

receiving an input defining properties defining three-dimensional attributes of each alphanumeric character according to a position of the alphanumeric character alone the path;

interactively rendering and displaying the alphanumeric character string in real time in three dimensions on a displan as changes to the alphanumeric character string are received, according to the three-dimensional model of each alphanumeric character, the position along the path of the alphanumeric character string at a specified point in time in the animation, and the properties defining three-dimensional attributes of each alphanumeric character in the alphanumeric character string according to the position of the alphanumeric character along the path; and rendering and displaying in real time on a display the three-dimensional animation of the alphanumeric character string according to the position of the alphanumeric character string along the path as a function of time, the three-dimensional model of each alphanumeric character in the alphanumeric character string, and the properties defining three-dimensional attributes of each alphanumeric character in the alphanumeric character string according to the position of the alphanumeric character along the path.

2. The method of claim 1, further comprising:
receiving an input indicating editing operations performed on the path.

3. The method of claim 1, further comprising:
receiving an input defining a curve, wherein the alphanumeric character string is placed between the path and the curve and has a size defined by a distance between the path and the curve.

4. The method of claim 3, wherein the path and the curve are parallel.

5. A computer system for producing three-dimensional animation of an alphanumeric character string along a path, comprising:
means for interactively receiving data indicating changes to the alphanumeric character string;
means for receiving an input defining a position of the alphanumeric character string along the path as a function of time;
means for receiving an input defining a three-dimensional model of each alphanumeric character in the alphanumeric character string;
means for receiving an input defining properties defining three-dimensional attributes of each alphanumeric character according to a position of the alphanumeric character along the path;
means for interactively rendering and displaying the alphanumeric character string in real time in three dimensions on a display as chances to the alphanumeric character string are received, according to the three-dimensional model of each alphanumeric character, the position along the path of the alphanumeric character string a at a specified point in time in the animation, and the properties defining three-dimensional attributes of each alphanumeric character in the alphanumeric character string according to the position of the alphanumeric character along the path; and
means for rendering, and displaying in real time on a display the three-dimensional animation of the alphanumeric character string according to the position of the alphanumeric character string along the path as a function of time, the three-dimensional model of each alphanumeric character in the alphanumeric character string, and the properties defining three-dimensional attributes of each alphanumeric character in the alphanumeric character string according to the position of the alphanumeric character alone the path.

6. The computer system of claim 5, further comprising:
means for allowing the user to edit the path.

7. The computer system of claim 5, further comprising:
means for allowing a user to define a curve, wherein the alphanumeric character string is placed between the path and the curve and has a size defined by a distance between the path and the curve.

8. The computer system of claim 7, wherein the path and the curve are parallel.

9. A computer program product, comprising:
a computer readable medium;
computer program instructions stored on the computer readable medium that, when executed by a computer, instruct the computer to perform a method for producing three-dimensional animation of a alphanumeric character string along a path, comprising:
interactively receiving data indicating changes to the alphanumeric character string;
receiving an input defining a position of the alphanumeric character string along the path as a function of time;
receiving an input defining a three-dimensional model of each alphanumeric character in the alphanumeric character string;
receiving an input defining properties defining three-dimensional attributes of each alphanumeric character according to a position of the alphanumeric character along the path;
interactively rendering and displaying the alphanumeric character string in real time in three dimensions on a display as changes to the alphanumeric character string are received, according to the three-dimensional model of each alphanumeric character, the position along the path of the alphanumeric character string at a specified point in time in the animation, and the properties defining three-dimensional attributes of each alphanumeric character in the alphanumeric character string according to the position of the alphanumeric character along the path; and
rendering and displaying in real time on a display the three-dimensional animation of the alphanumeric character string according to the position of the alphanumeric character string along the path as a function of time, the three-dimensional model of each alphanumeric character in the alphanumeric character string, and the properties defining three-dimensional attributes of each alphanumeric character in the alphanumeric character string according to the position of the alphanumeric character along the path.

10. The computer program product of claim 9, wherein the method further comprises:
receiving an input indicating editing operations performed on the path.

11. The computer program product of claim 9, wherein the method further comprises:
receiving an input defining a curve, wherein the alphanumeric character string is placed between the path and the curve and has a size defined by a distance between the path and the curve.

12. The computer program product of claim 11, wherein the path and the curve are parallel.

13. A computer system for facilitating creation of three-dimensional animation of an alphanumeric character string along a path, comprising:
means for specifying a position along the path for the alphanumeric character string as a function of time;
means for specifying at least one property for alphanumeric characters in the alphanumeric character string as a function of position of the alphanumeric character along the path;
means for specifying a shape for each alphanumeric character;
means for allowing a user to interactively edit the alphanumeric character string;
means for specifying a point in time in the three-dimensional animation;
means for rendering and displaying the alphanumeric character string in real time in three dimensions at the specified point in time in the animation, during the editing of the alphanumeric character stringy by the user, according to the specified position alone the path of the alphanumeric character string at the specified point in time in the animation and according to the specified property for each alphanumeric character at the position of the alphanumeric character along the path at the specified point in time in the animation and according to the shape specified for each alphanumeric character in the alphanumeric character string; and means for rendering and displaying the three-dimensional animation of the alphanumeric character string according to the position specified for the alphanumeric character string at each point in time in the three-dimensional animation, according to the property specified for each alphanumeric character at each position of the alphanumeric character along the path in the three-dimensional animation and according to the shape specified for each alphanumeric character in the alphanumeric character string.

14. The computer system of claim 13, wherein each property is defined by a property specification having values associated with a position scale ranging from zero to one and corresponding to the length of the path.

15. The computer system of claim 14, wherein the means for specifying a position along the path comprises:

means for receiving an indication of a specified image in the animation;

means for determining the number of images in the animation; and means for determining a position between zero and one corresponding to the position in the animation of the specified image as the specified position along the path.

16. The computer system of claim 13, further comprising: means for allowing a user to edit the path.

17. The computer system of claim 13, further comprising:

means for allowing a user to define a curve, wherein the alphanumeric character string is placed between the path and the curve and has a size defined by a distance between the path and the curve.

18. The computer system of claim 17, wherein the path and the curve are parallel.

19. A computer system for facilitating creation of a three-dimensional animated title for video, comprising:

means for specifying a title having a point in time and duration associated with the video and an associated alphanumeric character string;

means for specifying a position along a path for the alphanumeric character string as a function of time;

means for specifying at least one property for alphanumeric characters as a function of position along the path;

means for specifying a shape for each alphanumeric character;

means for allowing a user to interactively edit an alphanumeric character string associated with the title;

means for specifying a point in time in the duration of the title;

means for rendering and displaying, on an associated image of the video, the alphanumeric character string in real time in three dimensions at the specified point in time in the duration of the title, during the editing of the alphanumeric character string by the user, according to the specified position along the path of the alphanumeric character string at the specified point in time in the duration of the title and according to the specified property for each alphanumeric character at the position of the alphanumeric character along the path at the specified point in time in the duration of the title and according to the shape specified for each alphanumeric character in the alphanumeric character string; and means for rendering and displaying with the video, over the duration of the title, the three-dimensional animated title using the alphanumeric character string animated according to the position specified for the alphanumeric character string at each point in time in the three-dimensional animated title, according to the property specified for each alphanumeric character at each position of the alphanumeric character along the path in the three-dimensional animated title and according to the shape specified for each alphanumeric character in the alphanumeric character string.

20. The computer system of claim 19, wherein each property is defined by a property specification having values associated with a position scale ranging from zero to one and corresponding to the length of the path.

21. The computer system of claim 20, wherein the means for specifying a position along the path comprises:

means for receiving an indication of a specified image in the animation;

means for determining the number of images in the animation; and means for determining a position between zero and one corresponding to the position in the animation of the specified image as the specified position along the path.

22. The computer system of claim 19, further comprising: means for allowing a user to edit the path.

23. The computer system of claim 19, further comprising:

means for allowing a user to define a curve, wherein the alphanumeric character string is placed between the path and the curve and has a size defined by a distance between the path and the curve.

24. The computer system of claim 23, wherein the path and the curve are parallel.

25. A computer-implemented method for use in producing three-dimensional video animation of alphanumeric characters, comprising the steps of:

interactively receiving data indicating changes to an alphanumeric character string;

receiving data defining a three-dimensional model of each alphanumeric character in the alphanumeric character string, a sequence of temporally related images, properties defining variation in position alone a path of the alphanumeric character string, and properties defining variation of three-dimensional attributes of the alphanumeric characters in the alphanumeric character string according to a position of the alphanumeric character along the path;

receiving data indicative of a selection of a user defining an image of the sequence of temporally related images;

interactively rendering and displaying, the alphanumeric character string in real time in three dimensions as changes to the alphanumeric character string are received on a display in the selected image of the sequence of temporally related images, according to the received data defining the three-dimensional model and the received properties for each alphanumeric character according to the position of the alphanumeric character on the path in the selected image of the sequence of temporally related images; and rendering and displaying in real time on a display, on each of the images in the sequence of temporally related images, the alphanumeric character string according to the received data defining the three-dimensional model, the properties defining variation in position and the properties defining a variation of three dimensional attributes.

26. The computer-implemented method of claim 25, further comprising:

receiving an input indicating editing operations performed on the path.

27. The computer-implemented method of claim 25, further comprising:

receiving an input defining a curve, wherein the alphanumeric character string is placed between the path and the curve and has a size defined by a distance between the path and the curve.

28. The computer-implemented method of claim 27, wherein the path and the curve are parallel.

29. A computer system for use in producing three-dimensional video animation of alphanumeric characters, comprising the steps of:

means for interactively receiving data indicating changes to an alphanumeric character string;

means for receiving data defining a three-dimensional model of each alphanumeric character in the alphanumeric character string, a sequence of temporally related images, properties defining variation in position along a path of the alphanumeric character string, and properties defining variation of three-dimensional attributes of the alphanumeric characters in the alphanumeric character string according to a position of the alphanumeric character along the path;

means for receiving data indicative of a selection of a user defining an image of the sequence of temporally related images;

means for interactively rendering and displaying the alphanumeric character string in real time in three dimensions as changes to the alphanumeric character string are received on a display in the selected image of the sequence of temporally related images, according to the received data defining the three-dimensional model and the received properties for each alphanumeric character according to the position of the alphanumeric character on the path in the the selected image of the sequence of temporally related images; and means for rendering and displaying in real time on a display, on each of the images in the sequence of temporally related images, the alphanumeric character string according to the received data defining the three-dimensional model, the properties defining variation in position and the properties defining variation of three dimensional attributes.

30. The computer system of claim 29, further comprising:

means for allowing a user to edit the path.

31. The computer system of claim 29, further comprising:

means for allowing a user to define a curve, wherein the object is placed between the path and the curve and has a size defined by a distance between the path and the curve.

32. The computer system of claim 31, further comprising: wherein the path and the curve are parallel.

33. A computer program product comprising:

a computer readable medium;

computer program instructions stored on the computer readable medium that, when executed by a computer, instruct the computer to perform a method for computer-implemented method for use in producing three-dimensional video animation of alphanumeric characters, comprising the steps of:

interactively receiving data indicating changes to an alphanumeric character string;

receiving data defining a three-dimensional model of each alphanumeric character in the alphanumeric character string, a sequence of temporally related images, properties defining variation in position along a path of the alphanumeric character string, and properties defining variation of three-dimensional attributes of the alphanumeric characters in the alphanumeric character string according to a position of the alphanumeric character along the path;

receiving, data indicative of a selection of a user defining an image of the sequence of temporally related images;

interactively rendering and displaying the alphanumeric character string in real time in three dimensions as changes to the alphanumeric character string are received on a display in the selected image of the sequence of temporally related images, according to the received data defining the three-dimensional model and the received properties for each alphanumeric character according to the position of the alphanumeric character on the path in the selected image of the sequence of temporally related images; and rendering and displaying in real time on a display, on each of the images in the sequence of temporally related images, the alphanumeric character string according to the received data defining the three-dimensional model, the properties defining variation in position and the properties defining variation of three dimensional attributes.

34. The computer program product of claim 33, wherein the method performed by the computer further comprises:

receiving an input indicating editing operations performed on the path.

35. The computer program product of claim 33, wherein the method performed by the computer further comprises:

receiving an input defining a curve, wherein the alphanumeric character string is placed between the path and the curve and has a size defined by a distance between the path and the curve.

36. The computer program product of claim 35, wherein the path and the curve are parallel.

* * * * *